United States Patent [19]

Sheridan

[11] Patent Number: 4,916,727

[45] Date of Patent: Apr. 10, 1990

[54] APPARATUS FOR MEASURING THE VOLTAGE APPLIED TO A RADIATION SOURCE

[75] Inventor: Terrence E. Sheridan, North Bloomfield, Ohio

[73] Assignee: Keithley Instruments Inc., Solon, Ohio

[21] Appl. No.: 366,666

[22] Filed: Jun. 14, 1989

Related U.S. Application Data

[63] Continuation-in-part of Ser. No. 185,138, Apr. 22, 1988, Pat. No. 4,843,619.

[51] Int. Cl.⁴ .............................................. G01D 18/00

[52] U.S. Cl. ....................................... 378/207; 378/98

[58] Field of Search ................................. 378/207, 98

[56] References Cited

U.S. PATENT DOCUMENTS

| | | | |
|---|---|---|---|
| 3,766,383 | 10/1973 | Harris et al. . | |
| 4,361,900 | 11/1982 | Siedband | 378/207 |
| 4,697,280 | 9/1987 | Zarnstorff et al. | 378/207 |

OTHER PUBLICATIONS

Devices for Measuring Peak Kilovoltage of Diagnostic X-Ray Equipment, with Emphasis on Noninvasive Electronic Meters, by Martha E. Harshbarger-Kelly, vol. 1, No. 1, 1985 Health Care Instrumentation.

Keithley Instruments advertising brochure, "The Non-Invasive Advantage", Model 35080 kVp Divider.

Radiation Probe for Indirect Evaluation of the High-Voltage Waveform of a Mo Anode Mammography Unit, by M. Gambaccini, M. Marziani, and O. Rimondi, from Medical Physics, vol. 16, No. 1, Jan./Feb. 1989.

*Primary Examiner*—Craig E. Church

*Attorney, Agent, or Firm*—Tarolli, Sundheim & Covell

[57] ABSTRACT

Apparatus is provided for use in detecting the input voltage applied to a radiation source operating at an unknown voltage within a given voltage range. The apparatus includes a set of radiation absorbing filters including a first filter which includes a first chemical element and a second filter which includes a second chemical element. These elements are chosen so that the filters exhibit different radiation absorption characteristics within the given voltage range. The filters are adapted to be positioned so that the first and second filters are irradiated by the radiation source with the radiation impinging upon a surface of each filter and partially absorbed thereby as it passes therethrough so as to exit therefrom as attenuated radiation. A detector receives the attenuated radiation passed by the first and second filters and provides first and second signals having magnitudes which vary with the attenuated radiation respectively passed by the first and second filters. A ratio is determined as to the magnitude of the first signal to that of the second signal with the magnitude of the ratio varying with that of the input voltage. At least one of the first and second elements exhibits a known K absorption edge within the given voltage range. Consequently as the input voltage is increased to exceed the known K absorption edge that chemical element exhibits a greater attenuation characteristic to extend the useful range of the relationship of the magnitude of the ratio and the input voltage.

7 Claims, 3 Drawing Sheets

APPARATUS FOR MEASURING THE VOLTAGE APPLIED TO A RADIATION SOURCE

RELATED APPLICATION

This is a continuation-in-part of my previously filed U.S. patent application Ser. No. 185,138 filed on Apr. 22, 1988 entitled "Apparatus for Detecting Peak Voltage Applied to a Radiation Source" and which application is assigned to the same assignee as the present application.

FIELD OF THE INVENTION

This invention relates to the art of radiation measurement and, more particularly, to measuring the peak voltage applied to a radiation source, such as an X-ray generator, by monitoring the generated radiation.

BACKGROUND OF THE INVENTION

The calibration of an X-ray machine is important in diagnostic radiology. The measurement of the potential applied to an X-ray machine has been recognized as an important variable in the production of high quality diagnostic X-ray films. In the United States, the Radiation Control for Healthy and Safety Act of 1968 became law in 1973. The main intent of the law was to protect the population from unnecessary radiation exposure. One way to accomplish this is to reduce the number of retakes of X-rays. The law requires that X-ray machines meet certain requirements. One of these requirements is that the maximum applied input voltage, sometimes referred to as the peak kilovoltage (kVp), applied to the X-ray machine fall within certain limits specified by the manufacturer. If an X-ray machine is inaccurately calibrated, this may result in shortened component life and poor quality X-rays, which may result in retakes. Consequently, there is a need to periodically check the accuracy of the kVp setting on X-ray machines and recalibrate when required.

Diagnostic X-ray machines operate at relatively high voltages, such as on the order of 50 kV to 150 kV. Direct measurement of such a high voltage may be dangerous and has in the past been accomplished by disconnecting the high voltage circuits and reconnecting a high voltage divider having two large value resistance sections connected between the anode of the X-ray generator and ground and between the cathode of the generator and ground. The high voltage divider circuit is typically large in volume and size and the operation for measuring the high voltage in such apparatus is time-consuming and only qualified service personnel could accomplish this task. Hospital staff people have not normally been employed for conducting this test because of the size and weight of the divider circuit and the inherent danger involved in making such a measurement.

Alternatives to the direct measurement, utilizing a high voltage divider as discussed above, are various noninvasive measurement techniques presently being employed. This includes the use of a noninvasive film cassette, as well as a noninvasive electronic device employing filters and sensors. These noninvasive techniques measure the input voltage to an X-ray machine from measurements of the radiation the machine emits.

The film test cassettes (sometimes known as the Adrian Crooks or Wisconsin test cassette) have been used to determine the input kilovoltage to a radiation source from the measurements of the radiation it emits.

A test cassette is placed in the field of an X-ray beam and operates on the principle that the extent of attenuation of an X-ray in a material, such as copper or aluminum, is related to the kilovoltage applied to the X-ray tube. X-ray film is exposed to X-rays that have been attenuated while passing through multiple layers of material including a copper sheet and a sheet that includes copper disks and holes. The measurement requires the assistance of skilled technicians, development of the film and reading of the film with a densitometer. The accuracy of this method is on the order of ±5 kV. Moreover, since such a test cassette can measure only the effective or average kV and not the true peak of the waveform, results will not reveal significant ripple or spiking on the waveform.

Another noninvasive device for measuring input voltage supplied to an X-ray machine takes the form of an instrument known in the art as a kVp meter. Examples of such meters are disclosed in various U.S. patents, including the patents to Zarnstorff et al., U.S. Pat. Nos. 4,697,280, Siedband, 4,361,900, as well as products manufactured by Keithley Instruments, Inc. as model Nos. 35070 and 35080. In general, these kVp meters operate on the principle of passing an X-ray beam through a pair of copper filters positioned side-by-side so that the X-ray beam is attenuated as it passes through each filter. The two filters are of different thicknesses and, hence, as the radiation passes through each filter, it is attenuated differently. The attenuated radiation from each filter is then detected by a pair of X-ray detectors, such as solid state photodiodes, which provide output electrical signals having magnitudes which depend upon the attenuated radiation levels from the two filters. A ratio of these two signals is then made. This ratio will vary with the input kilovoltage applied to the X-ray tube. The X-rays passing through the thicker material increase faster with increasing input kilovoltage than the X-rays passing through the thinner material. Consequently, the ratio of the signals representative of radiation passed through the thick material to that of the thin material starts at zero and increases as the kilovoltage increases. For very large kilovolts, the ratio approaches unity.

These kVp meters typically operate over a voltage range from 50 to 150 kV. This is known in the art as the diagnostic range. The ratio of the radiation passed by the thick filter to that of the radiation passed by the thin filter is used as a measure of the input kilovoltage. The linear range of this relationship is limited. For example, the Keithly Model No. 35080 kVp meter employs three sets of copper filters each of which has substantial linearity over a portion of the diagnostic range. Thus, one filter set is typically employed from 50 to 90 kV, a second filter set is employed for 65 to 135 kV, and a third filter set is employed from 75 to 150 kV. It would be preferable to employ a single set of filters which would have acceptable linearity throughout the entire diagnostic range from 50 to 150 kV.

In addition to the limited linearity of the relationship between the ratio and the magnitude of the input kilovoltage another problem is presented if a single pair of copper filters is employed to cover the entire diagnostic range of, for example, 50 to 150 kV. This problem deals with the limited dynamic range presented. That is, in order to obtain adequate signals for low voltages on the order of 50 kV to 90 kV, the copper filters must be made of relatively thin material. However, if the filters are too thin then the ratio displays too large a dependency on changes in the filtration of the X-ray generator at higher voltages. It would be desirable to provide a single filter set which has a dynamic range so that it is useful over the entire diagnostic range from, for example, 50 kV to 150 kV.

Attempts to increase the useful range of operation of such kVp meters as discussed above have included employing multiple filter pairs with each pair being assigned for use over a particular voltage range, as discussed above, or employing a plurality of filter pairs which are simultaneously exposed in the same instrument. Where a single pair of filters has been employed, it has been attempted to linearize the output signal electronically while tolerating the problems of the limited dynamic range. Consequently, some kVp meters cannot measure low voltage fluoroscopic signals satisfactorily while others have too much dependency on X-ray machine filtration.

The present invention is directed toward determining the operating voltage of an X-ray machine employing a single pair of filters having a useful range, both linear and dynamic, which covers the voltage range of interest. In the discussion given herein, the useful range of a single filter set may cover the diagnostic range of from 40 kV to 150 kV.

The present invention is based on the recognition that a chemical element, such as lead or gadolinium, exhibits an absorption phenomena. Such elements when irradiated by an X-ray beam will absorb radiation at a predictable rate until the voltage applied to the X-ray machine attains a particular level and then a sudden transition takes place in the absorption rate. This transition is a sharp increase in the absorption rate and it corresponds with what is known as the K absorption edge of that particular chemical element. The K absorption edge refers to the K quantum shell. An electron can be removed from the K shell by photoelectric absorption. This takes place when photons of a sufficiently high energy level are incident upon an atom causing an electron to be ejected from the K shell. The threshold photon energy to achieve this is known as the K absorption edge.

The patent to G. R. Harris et al. U.S. Pat. No. 3,766,383 discloses an apparatus for calibrating the kilovoltage of a diagnostic X-ray generator. By placing a chemical element or test sample, having a known K-absorption edge, within an X-ray beam. Harris does not propose a kVp meter as discussed above employing a pair of filters but only a single chemical element having a known K absorption edge. The chemical element or test sample is disposed at an angle of approximately 45 degrees to the generator radiation path so that some energy is reflected as scattered energy, and some energy is transmitted through the sample as transmitted energy. The scattered energy and transmitted energy are detected and a ratio is calculated as to the transmitted and scattered detected radiation values. When this ratio changes significantly, it is indicative that the K edge has been reached. Since the sample has a known K absorption edge, this information is then used to determine the kilovoltage level.

Whereas Harris, supra, employs a chemical element having a K absorption edge for use in determining the kilovoltage of a diagnostic X-ray generator, there is no discussion or recognition presented as to how a single pair of filters may be employed having a useful range corresponding essentially to that of the diagnostic range of from for example 40 kVp to 150 kVp. Specifically, Harris does not recognize or discuss the limited linear range or the limited dynamic range of filters employed in prior art kVp meters.

SUMMARY OF THE INVENTION

It is an object of the present invention to provide an apparatus for determining the peak voltage applied to a radiation source while employing a single pair of filters having a useful range to cover the entire diagnostic range of measurement such as on the order of 40 kV to 150 kV.

It is a still further object of the present invention to provide improvements in kVp meters, as discussed herein, so as to extend the useful range of the linear relationship of the magnitude of the ratio to that of the input voltage and thereby obtain a far more linear relationship over the entire diagnostic range of measurement than that which has been obtained in the prior art.

It is a still further object of the present invention to provide such a kVp meter with improvements to obtain a wider dynamic range; that is, the ability to measure low intensity kVp fluoroscopic signals while having good rejection of variations in the inherent or added filtration of the X-ray tube at a high kV level.

In accordance with the present invention, apparatus is provided for measuring the input voltage applied to an X-ray radiation source operating at an unknown voltage within a given voltage range. The apparatus includes a pair of radiation absorbing filters including a first filter which includes a first chemical element and a second filter which includes a second chemical element. These elements are chosen so that the filters exhibit different radiation absorption characteristics within the given voltage range. These filters are adapted to be positioned so that they are irradiated by the radiation source with the radiation impinging upon each filter and partially absorbed thereby as it passes through the filters to exit therefrom as attenuated radiation. Detector means, such as first and second photodiodes, are positioned for receiving the attenuated radiation passed by the first and second filters and respectively providing first and second signals having magnitudes which vary with the attenuated radiation. A ratio is then obtained as to the magnitude of the first signal to that of the second signal. The magnitude of this ratio varies with that of the input voltage. One of the chemical elements exhibits a known K absorption edge within the voltage range so that as the input voltage is increased to exceed the known K absorption edge the chemical element including the known K absorption edge exhibits greater attenuation characteristics. This extends the useful range of the relationship of the magnitude of the ratio and the input voltage.

In accordance with another aspect of the present invention, it is the first chemical element that exhibits the known K absorption edge with the K absorption edge being at a voltage level toward that of the lower voltage of the voltage range of interest. This then increases the attenuation characteristics of the first filter for input voltages above the known K absorption edge. Stated otherwise, this lowers the attenuation characteristics of the first filter for input voltages which are below the known K absorption edge.

Still further in accordance with the present invention, it is the second chemical element that exhibits the known K absorption edge. In this case, the K absorption edge is at a voltage level toward the upper voltage level of the voltage range. This increases the attenuation characteristics of the second filter for input voltages which increase above the known K absorption edge.

Still further in accordance with the present invention, the useful range is extended at both ends of the voltage range by employing a first chemical element having a first known K absorption range at a voltage level toward that of the lower voltage of the voltage range and wherein the second chemical element exhibits a second known K absorption edge at a voltage level toward that of the upper voltage level of the voltage range.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein.

DESCRIPTION OF THE PREFERRED EMBODIMENT

Figure 1:
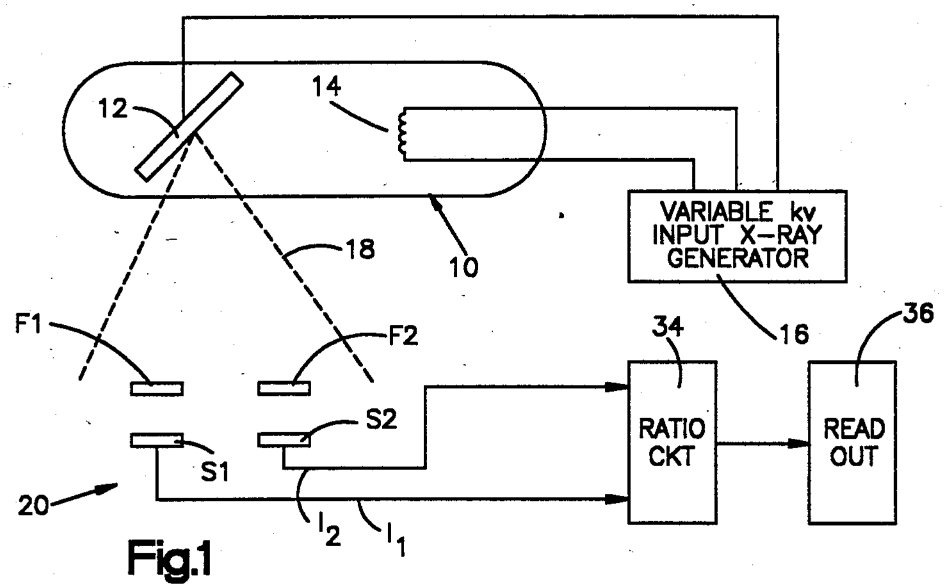
FIG. 1 is a schematic illustration showing one application of the invention for measuring the input voltage applied to an X-ray tube.

Referring now to FIG. 1, there is schematically illustrated an X-ray tube 10 having an anode 12 and a cathode 14. The anode 12 and the cathode 14 are connected to a variable kilovoltage X-ray generator 16 in a conventional fashion. The X-ray generator 16 is provided with means for supplying a variable kilovoltage to the X-ray tube over a range such as on the order of from 10 kilovolts to 150 kilovolts. The intensity and spectrum of the X-ray beam 18 generated by the X-ray tube varies with the setting of the variable kilovoltage supplied by the generator 16. The present invention is directed to calibrating this input voltage by a noninvasive means for determining the peak kilovoltage applied by measuring characteristics of the X-ray beam 18.

As shown in FIG. 1, a pair of filters F1 and F2 are positioned within the field of energy of the X-ray beam 18. These filters F1 and F2 may be identical in size and shape, such as rectangular slabs or circular discs, and which preferably lie flat in the same plane so that radiation from the X-ray tube impinges upon a flat surface of each filter. The detector 20 may include a pair of photodiode sensors S1 and S2 for respectively sensing the intensity of the radiation passed by the filters F1 and F2. Each photodiode sensor provides an output current having a magnitude dependent upon the intensity of radiation received. These output currents $I_1$ and $I_2$, respectively received from photodiode sensors S1 and S2, are supplied to a ratio circuit 34. The ratio circuit 34 provides an output corresponding with the ratio of the currents $I_1$ and $I_2$. This ratio is supplied to a suitable readout 36, which may take the form of an oscilloscope or a peak read and hold digital multimeter (DMM).

Figure 2:
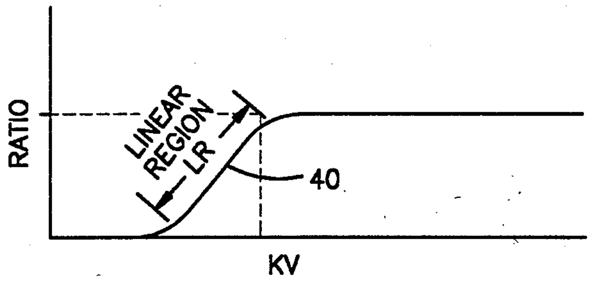
FIG. 2 is a graphical illustration of ratio with respect to kilovoltage illustrating the characteristic S curve useful in describing the present invention.

In kVp meters, the ratio of currents $I_1$ to $I_2$, hereinafter referred to as the ratio, varies with the magnitude of the input voltage applied to the X-ray tube 10. In prior art kVp meters such as the Keithley Model 35080 instrument described herein before, the material in filters 1 and 2 is usually the same, such as copper, but filter F1 is thicker. This generates a characteristic S curve as is shown in FIG. 2. For low levels of kV, the ratio is near zero and for high levels of kV, the ratio may be near one. The reason for the shape of this curve is that for low levels of kV the difference in attenuation is very high. Consequently, the ratio of currents $I_1$ to $I_2$ (in FIG. 1) will be near zero. At the high kV levels, neither filter stops much of the radiation and, hence, the ratio approaches unity (1). This characteristic S curve in FIG. 2 results from a smooth transition between these two levels. The linear region LR of the S curve is over a limited range. Consequently, so long as the ratio is within the linear region LR (FIG. 2) relatively accurate determinations can be had of the input voltage supplied to the X-ray tube.

The Keithley Model 35080 kVp meter employs three sets of filters to cover the voltage range from 50 kV to 150 kV. The three filter sets include one for the 50 to 90 kV range, another for the 65 to 135 kV range and a third for the 75 to 150 kV range. The filters employed in each filter set include two copper filters with the thicker filter being employed in the numerator of the ratio. However, in order to cover the different ranges, the filters of each set are of greater thickness for increasing voltage ranges. That is, the filters employed in the filter set for the 65 to 135 kV range are thicker than that for the 50 to 90 kV range. Also the filters employed in the filter set for the 70 to 150 kV range are thicker than that employed in the 65 to 135 kV range.

For each such prior art filter set there is a limited linear range for the relationship between the ratio and the kV reading. The accuracy within each range is within ±1.5 percent. This is seen from the correction curves of FIGS. 3, 4 and 5. Corrections for linearly can be made within each range by adding or subtracting the value in kV shown in each of the correction curves of FIGS. 3, 4, and 5 for the three filter set ranges. However, beyond the useful range of each filter set, the inaccuracy of the readings becomes quite pronounced. For example, the correction curve of FIG. 3, for the 50 to 90 kV filter set, shows that beyond a meter reading of 90 kV, the inaccuracy of the reading raises well beyond 3 KV. Similar inaccuracies can be seen from examination of the correction curves of FIGS. 4 and 5. Stated otherwise, the filter set which is reasonably accurate in the 50 to 90 kV range will not be useful throughout the rest of the diagnostic range to 150 kV. This requires that the operators of such kVp meters employ three sets of filters in order to obtain useful readings over the entire diagnostic range from 50 to 150 kV.

From the above it is seen that a prior art filter set made up of copper filters has a limited linear range and cannot be usefully employed over the entire diagnostic range. Moreover, if one attempts to employ such a pair of filters over the diagnostic range, then the dynamic range of the filters becomes a problem. That is, in order to obtain adequate signal for the low voltage range from 50 to 90 kVp, the filters must be of relatively thin material. However, if the filters are too thin then the ratio displays too large a dependency on changes in the inherent filtration of the X-ray generator at the high voltage end (75 to 150 kV).

In accordance with the present invention, the useful range of a single set of filters may be extended providing increased linearity and dynamic range wherein at least one of the filters is constructed of a chemical element that has a K edge within the voltage range of interest. For example, in the X-ray diagnostic range of from 50 kV to 150 kV, there are several useful chemical elements which exhibit a K edge. Some of these elements are listed below in Table I.

TABLE I

| Element | K Edge |
|---|---|
| Gadolinium | 50.240 kV |
| Erbium | 57.486 kV |
| Tantalum | 67.414 kV |
| Tungsten | 69.524 kV |
| Platinum | 78.395 kV |
| Gold | 80.723 kV |
| Mercury | 83.103 kV |
| Lead | 88.006 kV |

It is noted from the above that the listed chemical elements stop at Lead which has a K absorption edge at 88.006 kV. Chemical elements above this level tend to be radioactive and are considered impractical for use at this time.

Three different aspects of the invention are presented herein. In one aspect, the chemical element having a K absorption edge within the range of interest is employed as the denominator in the ratio, in the second aspect it is employed as the numerator in the ratio and in the third aspect, two such chemical elements are employed, one serving as the numerator and the other as the denominator in the ratio.

In accordance with the first aspect, the filter F2 employs a chemical element which has a K edge within the diagnostic range. As the intent is to increase the linearity and dynamic range for upper level voltages, this chemical element will have a K edge near the upper voltage level. For example, this chemical element may take the form of Lead which has a K absorption edge on the order of 88 kV.

Figure 3:
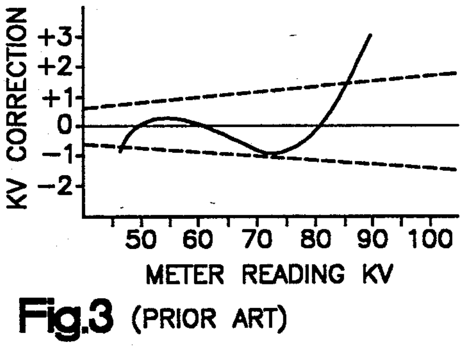
Fig.3 (PRIOR ART)
FIG. 3 is a prior art correction curve illustrating the kV corrections to be made for various kV readings at a low kV range of operation.
Figure 5:
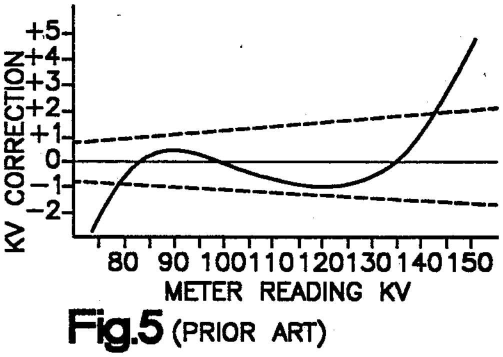
Fig.5 (PRIOR ART)
FIG. 5 is a prior art correction curve illustrating the kV corrections to be made for various kV readings at a higher kV range of operation.
Figure 4:
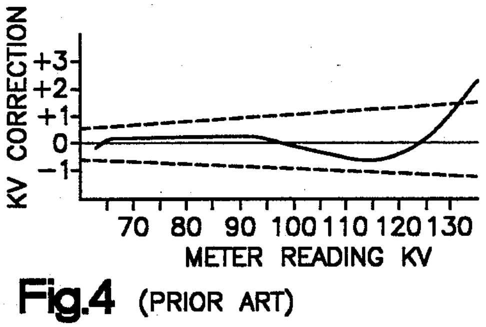
Fig.4 (PRIOR ART)
FIG. 4 is a prior art correction curve illustrating the kV corrections to be made for various kV readings at a middle kV range of operation.
Figure 6:
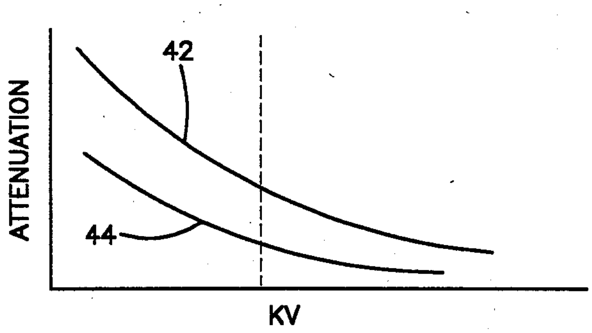
FIG. 6 is a graphical illustration of attenuation with respect to energy for purposes of illustrating attenuation characteristics.

Reference is now made to FIGS. 2, 6, 7 and 8. FIG. 2 illustrates the characteristic S curve of the ratio of currents $I_1$ to $I_2$ versus the kV voltage applied by the X-ray generator 16 for a pair of filters F1 and F2 that are constructed of copper. As previously discussed, the heavier filter F1 is in the numerator of the equation and exhibits the highest attenuation rate. The attenuation rates of these two filters is illustrated in FIG. 6 with the curve 42 representing the higher attenuation rate of the filter F1 in the numerator and curve 44 representing the lower attenuation rate of the lighter filter in the denominator. Using these two filters provides an S curve 40 which has a limited linear region LR that, as discussed hereinbefore with reference to FIGS. 3, 4 and 5, is not particularly useful for high kV levels.

Figure 7:
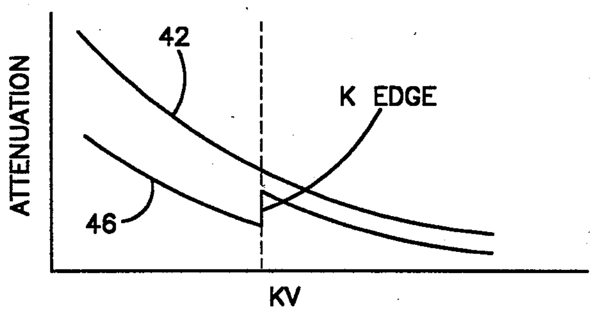
FIG. 7 is a curve similar to that of FIG. 6 but illustrating the K absorption edge of a chemical element.
Figure 8:
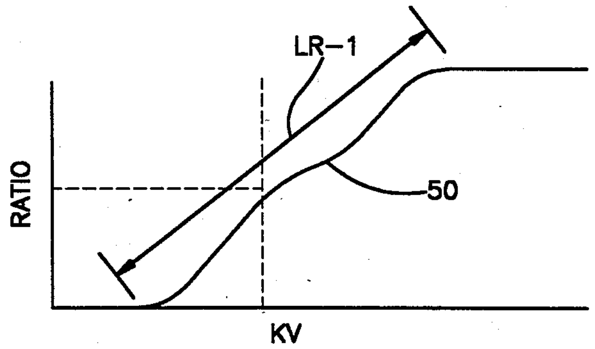
FIG. 8 is a graphical waveform similar to that of FIG. 2 but illustrating the extension of the characteristic S curve in practicing the present invention.

In accordance with the present invention, the useful range is extended to higher voltages by replacing the copper element of filter F2 with another chemical element that has a K absorption edge near the upper end of the voltage range of interest. For example, the copper may be replaced with lead which has a K absorption edge at 88.0 kV. The attenuation rate for lead is illustrated in curve 46 which shows that it has an attenuation rate very similar to that of curve 44 (FIG. 6) for copper until the input voltage attains a particular level corresponding with the K absorption edge of the lead filter. Thereafter, the lead filter sharply increases its attenuation rate as is shown in FIG. 7. This extends the range of the filter set without increasing the error. The lead filter F2 is employed in the denominator in the ratio. Consequently, above the K absorption edge the increased attenuation of the denominator causes the denominator of the ratio fraction to become smaller for voltages above the K absorption edge, in this case, for voltages above 88 kV. This causes an increase in the ratio which extends the linearity of the characteristic S curve 40 from that as shown in FIG. 2 to that as indicated by the S curve 50 in FIG. 8. From a comparison of curves 50 and 40, it is seen that the linear region LR of curve 40 has now been extended to the linear region LR 1 in FIG. 8. This increases the linearity at the high end of the filter set by allowing a much greater span of voltage with the same error, or within the same span with much less error, or some combination thereof. Moreover, greater dynamic range is achieved since the filter F2 (the denominator in the ratio equation) increases its attenuation for higher voltages thus acting as a light filter for low voltages and a heavy filter for high voltages.

In accordance with the second aspect of the invention, a chemical element having a K absorption edge within the voltage range of interest is used in the numerator of the ratio equation by replacing the copper element or filter F1 by a suitable chemical element. In this example, filter F1 may include the chemical element gadolinium which has a K absorption edge at 50.240 kV (see Table I). Such a K edge material will extend the linearity of the characteristic S curve for low voltages for reasons similar to that as discussed hereinabove with reference to the curves illustrated in FIGS. 2 and 6–8. The explanation for this is presented somewhat differently herein with reference to the curves shown in FIG. 9–12.

Figure 9:
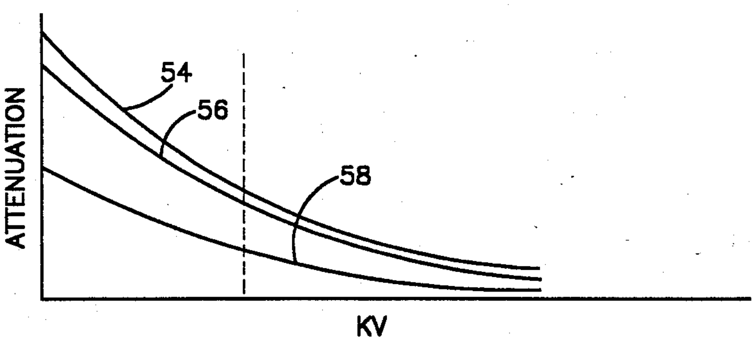
FIG. 9 is a view similar to that of FIG. 6 but illustrating attenuation with respect to energy of three different chemical elements for purposes of illustration herein.
Figure 10:
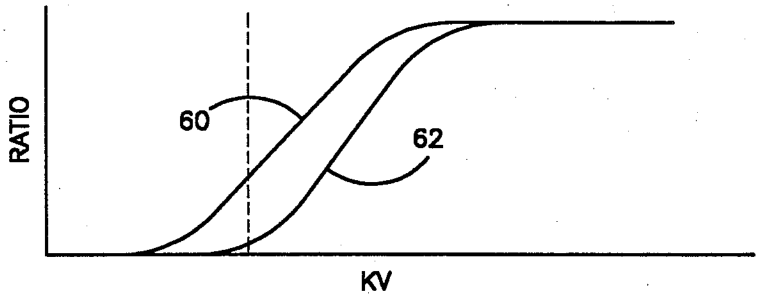
FIG. 10 is a graphical illustration similar to that of FIG. 5 but showing two characteristic S curves which are achieved by taking ratios of the attenuated radiation passed by the elements portrayed in FIG. 9.

Reference is now made to FIG. 9 which illustrates the attenuation rates for three different materials A, B, and C. Thus, curve 54 represents the attenuation rate for material A whereas curve 56 represents that for material B and curve 58 represents that for material C. If materials B and C are respectively employed as the filters F1 and F2 in FIG. 1 then the characteristic S curve for the ratio of radiation detected by sensors S1 and S2 would appear as curve 60 in FIG. 10. Similarly, if materials A and C are employed as filters F1 and F2, the characteristic S curve would appear as curve 62 in FIG. 10.

Figure 11:
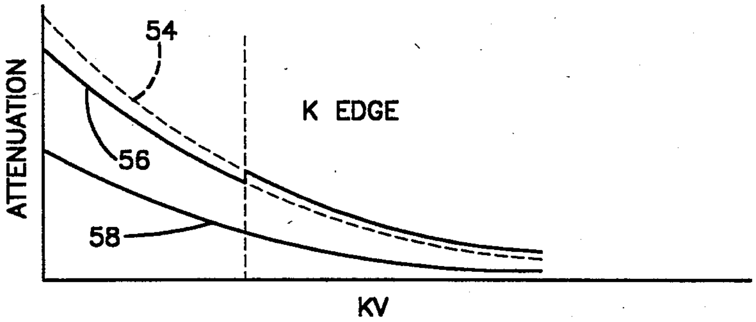
FIG. 11 is a graphical illustration similar to that of FIG. 9 but showing the K absorption edge of a chemical element to be employed in practicing the present invention.
Figure 12:
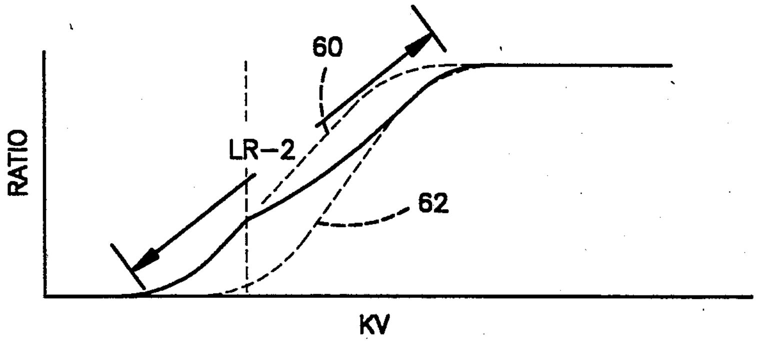
FIG. 12 is a graphical illustration similar to that of FIG. 10 but illustrating an extended characteristic S curve obtained in practicing the present invention.

Reference is now made to FIG. 11. Here there is illustrated a new material D which is substituted for the materials A and B in the numerator of the ratio equation. This material D has an attenuation rate which corresponds with that of material B (curve 56 in FIG. 9) until the input voltage attains a particular level corresponding with the K absorption edge of the material D. Thereafter, material D increases its attenuation rate to correspond with that of material A (curve 54 in FIG. 9). In the example being given, material D for filter F1 (this is the numerator) is gadolinium having a K absorption edge at 50 kV. The resulting characteristic S curve is shown in FIG. 12 which is a combination of the S curves 60 and 62 in FIG. 10. This then provides an extended linear range LR-2 at the lower voltage end of the voltage range of interest. It is seen that by employing K edge material such as gadolinium, for filter F1, the useful range of the filter set is extended at the low voltage range without increasing the error, or conversely, one can attain the same span with lower error by replacing the filter in the numerator with one that has a K edge at a relatively low value. As will be noted from FIG. 11, the numerator has a relatively high rate of attenuation for high voltage levels and a low rate of attentuation for low voltage levels. Moreover, greater dynamic range is achieved by employing the K absorption edge material D for the numerator as it lowers the attenuation for lower voltages while raising the attenuation for higher voltages (that is below and above the K absorption edge).

Figure 13:
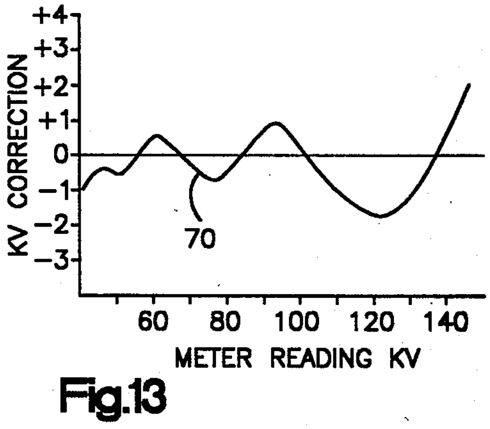
FIG. 13 is a graphical waveform illustrating the kV correction curve in practicing this invention with a single filter set over a range comparable to that encompassed by all three of the filter sets represented by FIGS. 2, 3 and 4.

The third aspect of the present invention combines the characteristics of the first and second aspects into a single filter set wherein both filters F1 and F2 include chemical elements which have K edges within the voltage range of interest. This will generate an extended linear range which would be an extension of FIGS. 8 and 12. Thus, in the example given, filter F2 (in the denominator of the ratio) would include the chemical element lead for extending the higher voltage ranges and the filter F1 (in the numerator in the ratio equation) would include the chemical element gadolinium to extend the linear range for the lower voltages. The dynamic range of the combined wide range filter would extend over the entire voltage range of interest (in this case from approximately 40 kV to 150 kV). This is illustrated by the curve 70 in FIG. 13 which shows that over the range from 40 kV to 150 kV, the deviation of the readings taken from the ratio circuit 34 (FIG. 1) from linear varies from less than 1 kV to as much as 3 kV. This compares with the three sets of filters employed in the prior art as evidenced by the corrections curves in FIGS. 3, 4, and 5. Consequently, by practicing this aspect of the invention, the useful range of the relationship of the magnitude of the ratio and the input voltage for a single set of filters can be extended over the entire diagnostic range from approximately 40 kV to 150 kV.

Whereas the invention has been described thus far in conjunction with the diagnostic range of an X-ray tube, it may also be employed in the mammographic range (from approximately 15 kV to 40 kV). There are several chemical elements that have K absorption edges within this range which may be employed for extending the linearity still further in the lower voltage ranges of operation. For example, Molybdenum has a K absorption edge at 19.999 kV, Cadmium has a K absorption edge at 26.711 kV, Tin has K absorption edge at 29.2 kV, and Barium has a K absorption edge at 37.411 kV.

Whereas the invention has been described with respect to various embodiments, it is to be appreciated that various changes may be made without departing from the spirit and scope of the invention as defined by the appended claims.

Having described preferred embodiments of the invention, the following is claimed;

1. Apparatus for measuring the input voltage applied to an X-ray radiation source operating at an unknown voltage within a given voltage range comprising:

a pair of radiation absorbing filters including a first filter which includes a first chemical element and a second filter which includes a second chemical element;

said elements being chosen so that said filters exhibit different radiation absorption characteristics within said voltage range;

said filters adapted to be positioned so that said first and second filters are irradiated by said radiation source with the radiation impinging upon a surface of each said filter being partially absorbed thereby as it passes therethrough so as to exit therefrom as attenuated radiation;

detector means positioned for receiving the attenuated radiation passed by said first and second filters and providing first and second signals having magnitudes which vary with the attenuated radiation respectively passed by said first and second filters;

ratio means for providing a ratio indication representative of the ratio of the magnitude of said first signal to that of said second signal wherein the magnitude of said ratio varies with that of said input voltage;

wherein at least one of said first and second elements exhibits a known K absorption edge within said voltage range so that if said input voltage is increased to exceed said known K absorption edge the said one of said chemical elements exhibits greater attenuation characteristics.

2. Apparatus as set forth in claim 1, wherein said first chemical element exhibits said known K absorption edge.

3. Apparatus as set forth in claim 2, wherein said known K absorption edge of said first chemical element is at a voltage level toward the lower voltage of said voltage range to thereby decrease the attenuation characteristics of said first filter for input voltages below said known K absorption edge.

4. Apparatus as set forth in claim 1, wherein said second chemical element exhibits said known K absorption edge.

5. Apparatus as set forth in claim 4, wherein said known K absorption edge of said second chemical element is at a voltage level toward the upper voltage level of said voltage range to thereby increase the attenuation characteristics of said second filter for input voltages above said known K absorption edge.

6. Apparatus as set forth in claim 1 wherein said first chemical element exhibits a first K absorption edge and wherein said second chemical element exhibits a second K absorption edge with said second K absorption edge being at a substantially higher voltage than that of said first K absorption edge to thereby decrease the attenuation rate of said first filter for input voltages below said first K absorption edge and to increase the attenuation rate of said second filter for input voltages above said second K absorption edge.

7. Apparatus as set forth in claim 6 wherein said first chemical element is gadolinium and wherein said second chemical element is lead.

* * * * *